Oct. 11, 1955 C. BLOUNT, JR 2,720,018
SHRINKAGE CONTROLLING MEANS
Filed Aug. 28, 1952 4 Sheets-Sheet 2
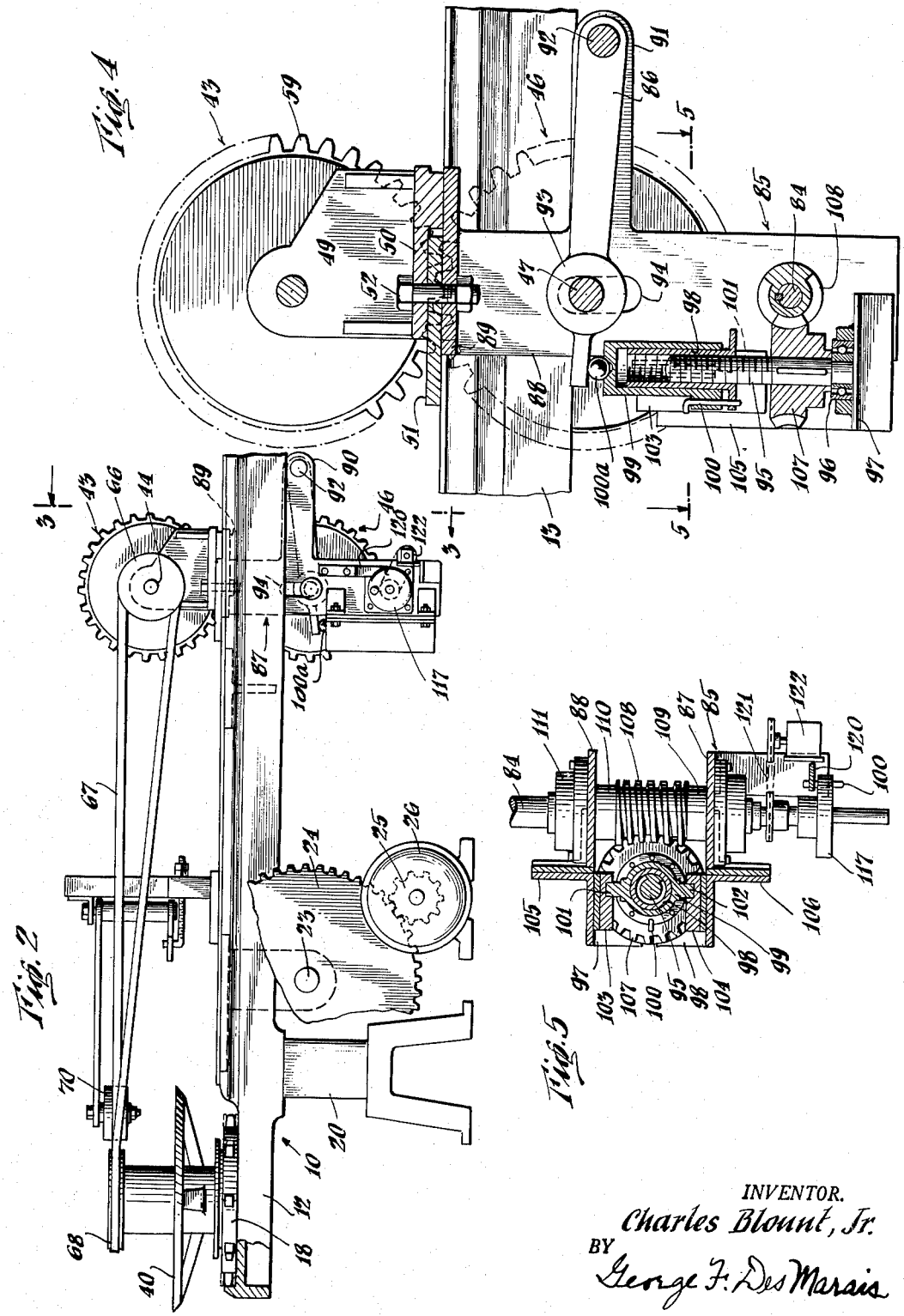
INVENTOR.
Charles Blount, Jr.
BY
George F. Des Marais
ATTORNEY

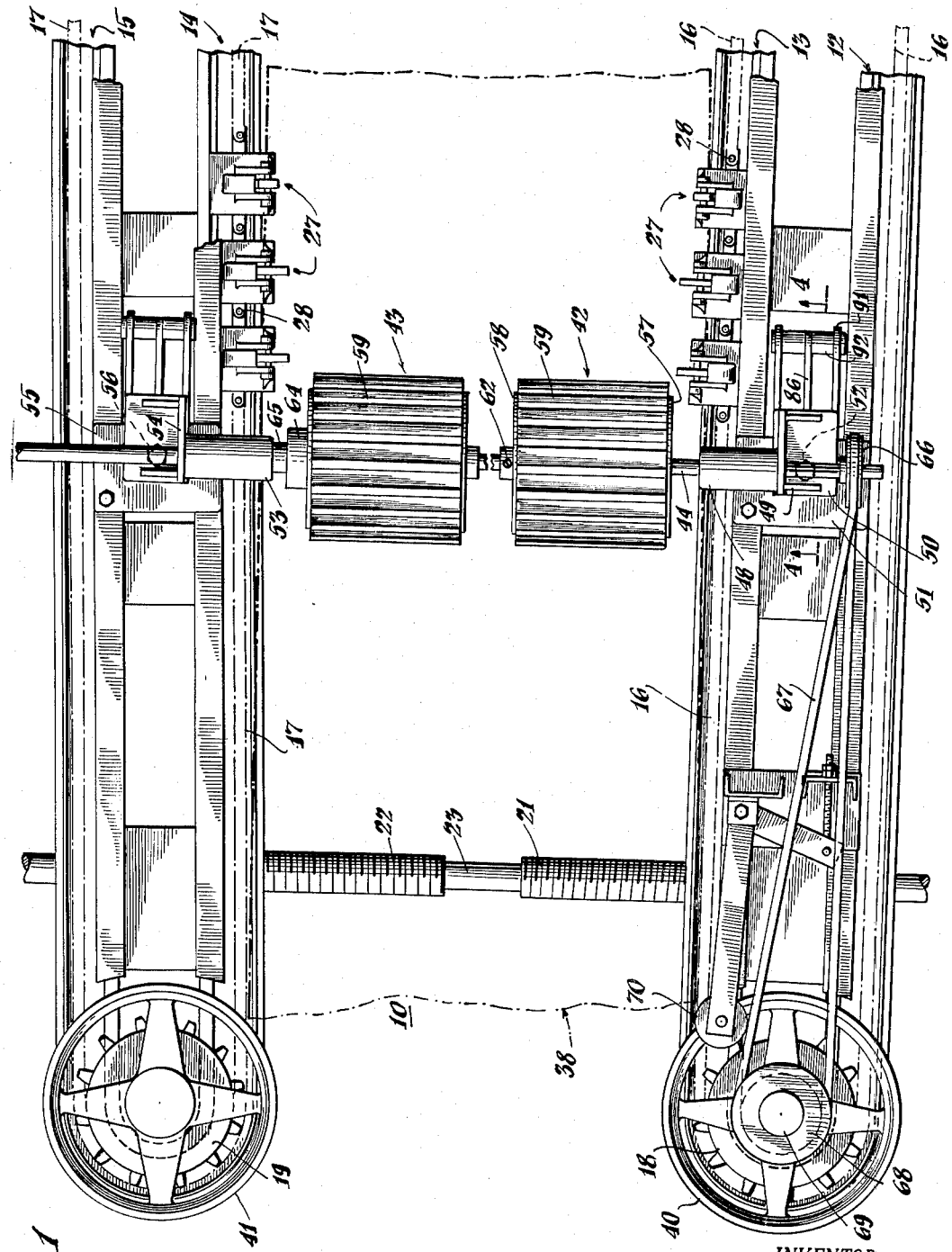

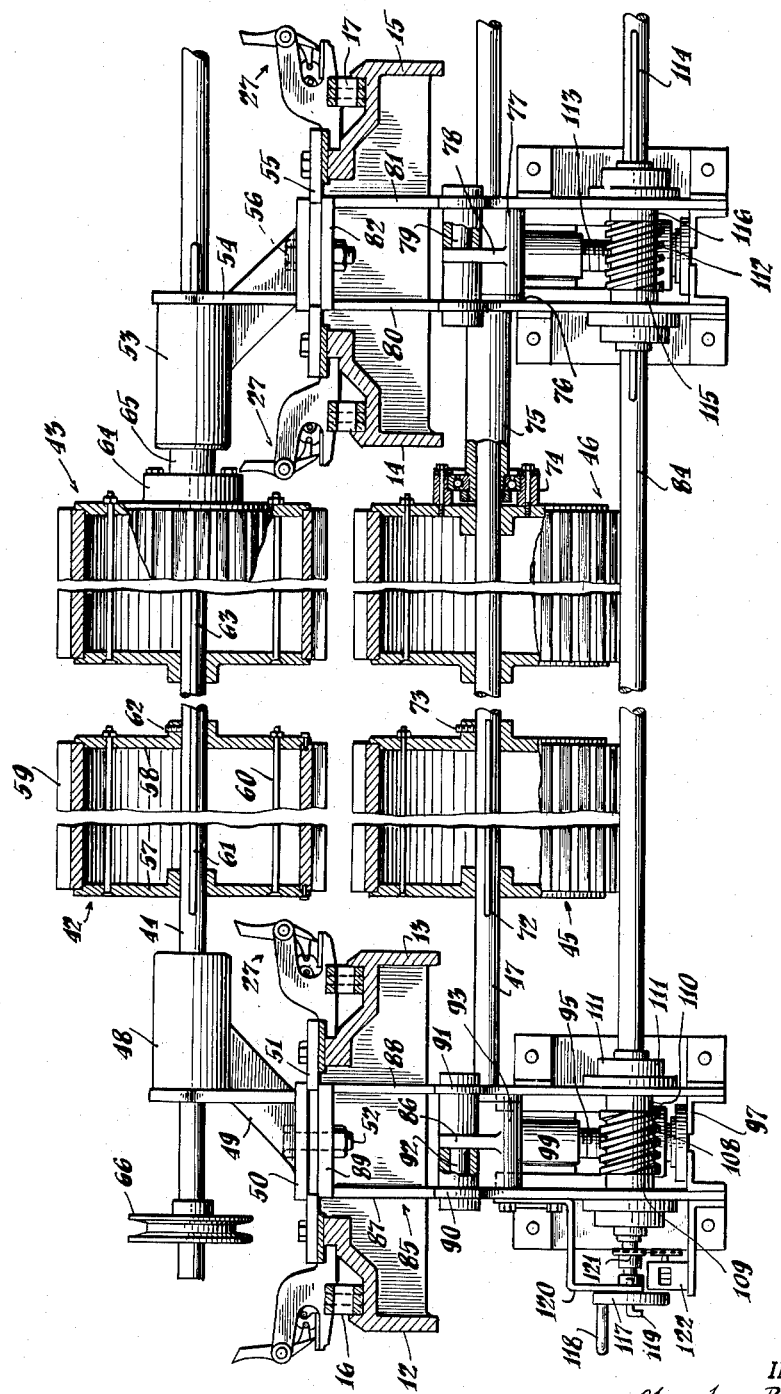

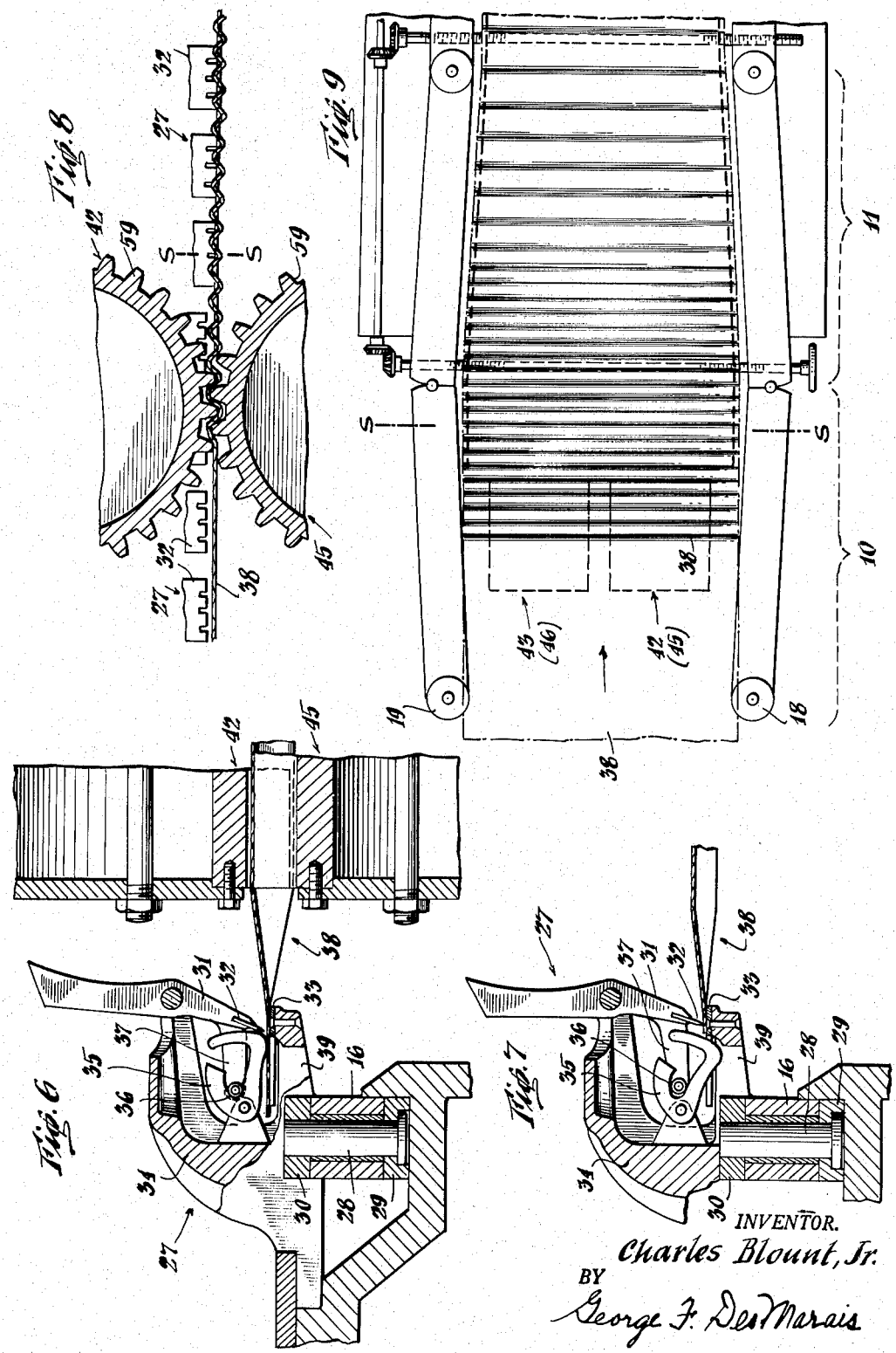

United States Patent Office 2,720,018
Patented Oct. 11, 1955

2,720,018
SHRINKAGE CONTROLLING MEANS

Charles Blount, Jr., Westport, Conn., assignor to The United Piece Dye Works, Lodi, N. J., a corporation of New Jersey Application August 28, 1952, Serial No. 306,779

7 Claims. (Cl. 26—18.5)

This invention relates to means for controlling shrinkage in textile materials, and more particularly to overfeeding mechanisms for tenter frames.

Among the objects of the invention is to supply damp textile material to a drying and cross-stretching machine, such as a tenter frame, at a speed higher than the speed of the material during its travel through the machine so as to enable the material to dry in a longitudinally relaxed condition as the width of the material is controlled by the cross-stretching effect of the machine.

The invention comprises mechanism for feeding a strip of damp textile material in a warpwise direction and at the same time imparting thereto an undulated contour having ridges and valleys running weftwise of the material, and presents the material in undulated form to gripping devices which grip the opposite edges of the material and travel in substantially parallel or parallel lines at a uniform rate. The gripping devices are carried by the endless chains of a tenter frame and these gripping devices successively grip the edges of the material as they travel past a predetermined station which is located along the rails of the tenter frame beyond the feeding mechanism.

The overfeeding mechanism comprises a pair of oppositely positioned elements having toothed peripheries with some of the teeth of the respective elements intermeshing with each other and with a portion of the strip of material therebetween. The toothed elements, such as toothed rollers or wheels, are driven in timed relation to the speed of the gripping devices and of the movement of the strip of material engaged thereby as it travels through the tenter frame. The ratio of the length of material being advanced by the toothed elements to the length of material seized by the gripping devices may be varied by changing the ratio of speed of the toothed elements to the speed of the gripping elements, or by changing the amount of overlapping of the meshing teeth of the toothed elements.

The toothed elements are mounted on shafts extending crosswise of the strip of material opposite the upper and under surfaces thereof. The bearings for the shafts are mounted on the longitudinal rails of the tenter frame in such a manner that the shafts may be pivoted in horizontal planes when change is made in the angularity of the supporting rails with respect to each other. Means are provided for changing the elevation of the bearings of the lower shaft in order to vary the amount of overlapping of the meshing teeth and the depth of undulations imparted to the material by the overfeeding mechanism.

The present invention affords a means of shrinking material to a desired optimum without subjecting the material to warpwise tension.

Further and other objects of the invention are hereinafter set forth in the accompanying specification and claims and demonstrated by the drawing which illustrates an embodiment of the invention and what is now considered to be the best mode for applying the principle thereof. Other embodiments employing the same principle may be used and structural changes made as desired by those skilled in the art within the spirit of the appended claims and without departing from the present invention.

In the drawing:

Fig. 1 is a plan of the entering end of a tenter frame and of the overfeeding mechanism of the present invention;

Fig. 2 is a side elevation of the portion of the tenter frame illustrated in Fig. 1 and of the overfeeding mechanism;

Fig. 3 is an enlarged section crosswise of the tenter frame on line 3—3 of Fig. 2;

Fig. 4 is a section on line 4—4 of Fig. 1 and illustrating means for adjusting the spacing between the toothed elements of the overfeeding mechanism;

Fig. 5 is a horizontal section on line 5—5 of Fig. 4;

Fig. 6 is a section through a guide rail for the gripping devices and showing the application of sinuous contours to a strip of textile material;

Fig. 7 is a section through a guide rail showing a gripping device engaging an edge of the material;

Fig. 8 diagrammatically illustrates the application of undulations to a strip of material; and Fig. 9 shows a portion of a tenter frame and diagrammatically illustrates a strip of textile material in the course of processing.

One branch of finishing of textile materials is concerned with means for eliminating shrinkage in cloth so that it will not shrink after it has been made up into clothing and is washed. Machinery commonly used in a finishing plant operates in such a manner as to impart longitudinal or warp-wise tension in the material, and if the material dries in this condition it will shrink when re-wet. Types of driers which dry material under very little longitudinal or warp-wise tension do not hold the material under cross or weft-wise tension while drying, and therefore additional operations are required to extend the material to an optimum width and to give the material a properly finished and salable appearance. A tenter frame is generally used to recover width, but in the absence of provision being made, the material being processed in a tenter frame is usually subjected to at least some tension warpwise of the material so that the material treated or dried is subject to warpwise shrinking.

The overfeeding mechanism of the present invention improves upon previous operations by having the material relatively loose warpwise as it is advanced along the tenter frame so that it can dry in a substantially tensionless condition warpwise and still be held at a desirable weft width until dry. The resulting product is a strip of textile material having a desired optimum width which will not shrink appreciably in any direction as the result of re-wetting.

In Figs. 1 and 2 there is illustrated the entering end of the first section of a tenter frame. Two such sections 10 and 11, pivoted together at adjacent ends, are illustrated in Fig. 9, and it will be understood that the tenter frame has as many such sections as are desired for treating the particular kind of material to be processed. Each section includes parallel guide rails 12 and 13 at one side of the section, and 14 and 15 at the other side of the section. These rails support and guide endless chains 16 and 17, respectively, which travel the length of the tenter frame. At the ends of the tenter frame the chains are engaged by sprocket wheels like the sprocket wheels 18 and 19 shown at the left end of Fig. 1. The sprocket wheels (not shown) at the discharge end of the tenter frame are motor-driven at a constant rate, and the chains travel continuously lengthwise of the tenter frame during the operation of the machine. The inner reaches of the chains travel from left to right, as shown in Figs. 1 and 9.

The longitudinally extending guide rails are mounted on cross-rails 20, one of which is shown in Fig. 2. They are spaced at intervals lengthwise of each section. The pairs of guide rails at each side of the tenter frame can be spaced apart at any desired distance for accommodating different widths of textile materials. For adjusting the spacing of the rails, left and right-hand screws 21 and 22 are provided, Fig. 1, which are fast to a shaft 23 extending crosswise of the frame. Each of the screws 21 and 22 engages nuts (not shown) fixed with respect to the respective pairs of longitudinally extending rails. As illustrated in Fig. 2, the shaft 23 carries a gear 24 which is engaged by a gear 25 of a motor 26 from which power is derived for rotating the shaft 23. It is customary to provide similar adjusting shafts and screws adjacent the ends of each section of a tenter frame so that the rails at opposite sides of each section may be spaced as desired, either parallel to one another, or inclined, as illustrated in Fig. 9.

Each endless chain is made up of or includes a plurality of devices for gripping the longitudinal edges or selvages of a strip of textile material. Sections of a conventional type of gripping device in the form of a clip 27 are illustrated in Figs. 6 and 7. These devices are linked to one another or to connecting links by means of rivets 28. Customarily each gripping device constitutes a link in the endless chain having bosses 29 and 30 connected together by the rivets 28.

A standard type of clip is illustrated for explaining the manner of operation of the machine, but other types of gripping devices may be employed with the present invention. In this type of gripping device a pivoted jaw 31 is provided with a blade 32 which wedges against a plate 33 to seize the edge of the material between the blade and the plate, as shown in Fig. 7. The frame 34 of the gripping device also pivotally supports a controller 35 which engages a roller 36 mounted on an arm 37 of the jaw 31. The relationship of the jaw and of the controller is such that when the jaw has been pivoted clockwise, as shown in Fig. 6, and the selvage of the material 38 intervenes between the plate 33 and the controller 35, the blade will remain out of gripping contact with the selvage. When the selvage is withdrawn from beneath the controller 35, the controller is permitted to rotate and partially enter a slot 39, as shown in Fig. 7, thereby enabling the jaw 31 to rock and the blade 32 to seize the extreme edge of the selvage and hold the same against the plate 33.

There are numerous available clips or gripping devices which may be used in a tenter frame for engaging the selvages of a strip of material. It is understood that the gripping devices are normally closed as they travel from the discharge end of the tenter frame to the entering end of the tenter frame. At the entering end of the tenter frame they are opened by the clip-opening wheels 40 and 41 (Fig. 1), as is well understood. These wheels are mounted to rotate with the sprocket wheels 18 and 19, respectively. Tenter frames commonly are provided with means at their discharge ends for opening the clips to release the material, or with devices for disengaging the material from other forms of devices by which the material is carried.

The selvages of the trailing portion of a strip of material travelling through a tenter frame extend under the raised jaws of the clips as the strip travels past the opening wheels 40 and 41. The longitudinal guide rails of the first section 10 (Fig. 9) are arranged to diverge slightly so that the spacing of the courses of the clips at either side of the tenter frame gradually increases. As the material is drawn along the frame by previously closed clips the selvages of its trailing portion gradually withdraw from the diverging lines of travel of the open clips until the controllers 35 of the open clips are permitted to drop and allow the blades 32 to close upon the edges of the material. The points of closing of opposite clips lie in a line shown as S—S, Fig. 9. The position of this line lengthwise of the frame is dependent on the width of the strip of material and the angularity of the guide rails of the section 10 of the frame.

In the foregoing I have described so much of a conventional tenter frame as is necessary to afford an understanding of the operation of machines for treating cloth and which provide for supporting and longitudinally moving a strip of material while holding the material distended transversely of the path of movement, but it is to be understood that the principle of the invention is adaptable to different types of such machines including machines utilizing various forms of tenter clips or pin boards for gripping the material.

The present invention includes mechanism which feeds a strip of material in a longitudinally relaxed condition so that it will be received and held in that condition by the gripping devices of a tenter frame. The material is literally overfed to the tenter frame by producing an undulated contour therein having ridges and valleys extending transversely across the material. The resulting overfeed effects a feed of more length of material than if the material were fed under warpwise tension or at a rate of travel substantially equal to the rate of travel of the gripping devices.

The overfeeding mechanism includes a pair of oppositely positioned driven elements having toothed peripheries with some of the teeth of the respective elements intermeshing with each other with a portion of the strip of material therebetween. While toothed elements may be made in the form of endless belts having teeth spaced along their surfaces, it is preferred to employ cylindrical gear-like elements or toothed rollers, such as are illustrated in the drawing. In the embodiment of the invention illustrated, a pair of toothed rollers 42 and 43 (Fig. 3) is mounted on a shaft 44 disposed above the plane of the gripping devices, and a pair of toothed rollers 45 and 46 is mounted upon a shaft 47 disposed below the plane of the gripping devices.

The shafts 44 and 47 are carried or supported by the longitudinal rails of the tenter frame in such a manner that the rails at either side of the frame may be moved laterally with respect to each other. One end of the shaft 44 is journalled in a bearing 48 which prevents axial movement of the shaft. This bearing is supported by a bracket 49 having a base 50 resting upon a horizontal plate 51. The plate 51 is bolted to and supported by the rails 12 and 13. The base 50 of the bearing 48 is held by a bolt 52 which permits the bearing to move about the axis of the bolt 52 whenever adjustment is made in the angularity of the longitudinal rails of the tenter frame.

The other end of the shaft 44 is slidably and rotatably mounted in a bearing 53 which is supported by a pivoted bearing support 54 mounted for pivotal movement on a plate 55 bolted to the longitudinal rails 14 and 15. The connecting bolt 56 permits the bearing support to pivot with respect to the rails.

Each toothed roller is hollow and includes flanking hub plates 57 and 58 separated by a plurality of teeth 59 and held in assembled relationship by bolts or rivets 60. The teeth are preferably made of a laminated plastic or of wood, and, in general, have a shape similar to the teeth of conventional gear wheels. The toothed roller 42 is attached to the shaft 44 by a spline 61 and a set screw 62. The toothed roller 43 is mounted to the shaft 44 by a key which engages the hub plates and is slidable in a long keyway 63 for enabling movement of the roller axially of the shaft. The roller 43 is held in spaced relationship to the bearing 53 by a thrust bearing 64 carried by a positioning sleeve 65 which is supported from the bearing 53.

A pulley 66 is fixed to the shaft 44. This pulley is driven from a belt 67 (Figs. 1 and 2) which passes over a drive pulley 68 mounted on shaft 69 to which the sprocket wheel 18 is fastened. An idler roller 70 bears upon the drive belt 67. Since the pitch velocity of the toothed rollers is proportional to the velocity of the endless chains, the amount of overfeed of the material may be controlled by varying the driving ratio between the pulleys.

As shown in Fig. 3, the toothed roller 45 is mounted on the shaft 47 and is fixed in position on the shaft by a spline 72 and a set screw 73. The toothed roller 46 is mounted for rotation on the shaft 47 and it is held in spaced relationship to the rails 14 and 15 by a thrust bearing 74 which is engaged by the hub of the roller and by a positioning sleeve 75. The positioning sleeve has a flange 76 which is bolted to and supported by a hub 77 on a lever 78. The hub 77 contains bearings which support the shaft 47 and allow the shaft to slide axially.

The lever is pivotally mounted on a shaft 79 which is supported by vertical side members or plates 80 and 81. These plates are fastened at their upper ends to a head plate 82 and constitute therewith a supporting frame suspended from and pivotal about the bolt 56. This end of the shaft 47 is elevated or depressed by pivoting the lever 78 with respect to the supporting frame by rotating the shaft 84 in one or the other direction, as will be explained in more detail hereinafter and in reference to the supporting frame 85 and the lever 86 at the other side of the tenter frame.

The supporting frame 85 includes vertical side members or plates 87 and 88 fastened to a head plate 89. The frame is pivotally supported from the horizontal plate 51 by the bolt 52. As best seen in Figs. 2 and 3, the side members 87 and 88 have fingers 90, 91, respectively, between which the pivot shaft 92 of the lever 86 is mounted. The lever 86 has a hub 93 through which the shaft 47 extends. The shaft 47 is mounted for rotation in thrust bearings (not shown) which are contained in recesses within the hub and disposed adjacent the side plates 87 and 88. The shaft 47 passes through elongated openings 94 in the plates 87 and 88 which enable the shaft 47 to be raised or lowered with respect to the supporting frame as the lever 86 is pivoted on the shaft 92.

The lever 86 is supported by an elevating device which includes a screw 95 whose lower end is mounted on a thrust bearing 96 seated on brackets 97 carried by the vertical plates 87 and 88. The screw 95 engages the inside thread of a flanged nut 98 which has an outside thread engaging the threaded bore of a non-rotatable nut 99. The inside and outside threads of the nut 98 are of slightly different pitch for adjusting purposes. The two nuts are normally locked together by a pin 100. A socket in the closed upper end of the nut 99 seats a ball 100a which supports the end of the lever 86. The nut 99 has rails 101, 102 (Fig. 5), slidably engaging vertical grooves in the guide blocks 103, 104, respectively. These blocks are supported from angle irons 105, 106, which are respectively fastened to other angle irons attached to the plates 87 and 88.

A worm wheel 107 is keyed to the screw 95 and engages a worm 108 fast to the shaft 84 between the thrust bearings 109 and 110. The shaft 84 is journalled in flange bearings 11, which are supported from the plate 88.

The shaft 84 also carries a worm 112 (Fig. 3) by which the elevating screw 113 is rotated to pivot the lever 78 concomitantly with the pivoting of the lever 86 for moving the toothed roller shaft 47 parallel to itself. A short key is fitted in a groove in the bore of the worm 112 and the key engages in a long keyway 114 in the shaft 84. The thrust bearings 115 and 116 prevent endwise movement of the worm and key with respect to the side plates 80 and 81. The elevating mechanism, including the worm 112, and the elevating screw 113, may be constructed similarly to the elevating mechanism at the other side of the tenter frame and which has been described in detail with reference to Figs. 3, 4 and 5, but the vernier adjusting nut 98 (Fig. 4) need not be employed at both sides. By turning the nut 98 one end of the shaft 47 can be raised or lowered independently of the other end.

The shaft 47 is moved vertically for adjusting the depth of meshing or the amount of overlapping of the teeth of the upper and lower sets of toothed rollers. The strip of material 38 is threaded between the toothed rollers and the meshing teeth impart an undulated contour to the strip of material, as diagrammatically illustrated in Fig. 8.

The depth of meshing of the teeth of the opposite rollers is an exact measure of the percentage of overfeed which is accomplished by the toothed rollers. The closer the opposite rollers are spaced, the greater the percentage of overfeed, and vice versa. It is therefore important to be able to reset the spacing of the opposite rollers whenever it is desired to do so. The shaft 84 is rotatable by a crank 117 in the form of a disk to which a handle 118 is attached, Figs. 2 and 3. This disk has a circle of holes concentric to the axis of the shaft and in any of which a pin 119 is insertable. When the pin is engaged in one of these holes and also in a hole in a stationary bracket 120, the shaft 84 is held against rotation. The shaft 84 has a sprocket and sprocket wheel connection 121 with the shaft of a revolution counter 122 from which an indicated reading of the adjusted position of the shaft 84 may be obtained. The counter provides an indication of the degree of meshing of the toothed rollers and the percentage of overfeed of the strip of material.

The toothed rollers 42, 43, 45 and 46 gather or contract the material in a warpwise direction and present it in the form of an undulated contour to the moving rows of serially connected gripping devices which successively grip the selvages of the material without substantially altering the distance between successive undulations in the body of the material and carry the material lengthwise of the tenter frame as it dries. The rows of gripping devices maintain the material extended weftwise to the extent desired for drying or otherwise treating the material. Because of the presence of ripples or undulations in the material, it is free from longitudinal or warpwise tension during its progress through the tenter frame or until the undulations flatten out or disappear as drying takes place. The material can be dried without substantial warpwise tension, or with such degree of tension as may be desired.

As illustrated in Figs. 8 and 9, the location of the overfeeding mechanism is in advance of the station S—S at which the clips close upon the edges of the strip of material 38. This distance is variable in different frames and in view of the kind and weight of material being processed. It is important only that the undulations imparted to the material are present when the gripping devices are contributing the holding force by which the material is advanced through the tenter frame. As is well known, this force is contributed by the cumulated effort of the many closed tenter clips moving lengthwise of a number of sections of the frame of which only two are illustrated in Fig. 9. The toothed rollers can be located in advance of or at the line S—S at which initial closing of the clips occurs, or even beyond the station S—S, is desired. When they are located beyond the station S—S they operate to pull the material through the last-closed of the clips which individually exert very little restraint against longitudinal slippage of the strip. The preferred location of the toothed rollers is in advance of the station S—S, and this arrangement is necessary in any type of tenter frame employing gripping devices which do not permit lengthwise slippage of the material once the material is engaged by the devices as, for example, when pin boards are employed.

If desired, pull rollers may be located in advance of the toothed rollers whereby the toothed rollers would be relieved of some of the work of pulling the strip of material into the tenter frame, but it has been found that the toothed rollers serve adequately for accomplishing this function. If additional pull rollers are utilized, they would be driven from the tenter frame at a desired speed with respect to the speed of the toothed rollers and the speed of the endless chains.

This invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular showing herein to indicate the scope of this invention.

What is claimed is:

1. In an overfeeding mechanism for a tenter frame having spaced-apart rails and means supporting and longitudinally moving a strip of textile material distended transversely of said rails, the combination comprising a pair of parallel shafts extending crosswise of said rails with one of said shafts disposed opposite the upper surface of said strip and the other of said shafts disposed opposite the under surface of said strip, bearings rotatably supporting said shafts, means carried by said rails for supporting said bearings for pivotal movement in a plane parallel to the plane of travel of said strip, toothed rollers mounted on said shafts and having teeth for contacting opposite surfaces of said strip thereby to contract said strip into undulations for presenting said strip in undulated form to said strip-supporting and moving means, and means for driving said shafts and toothed rollers in timed relation to the speed of said strip-supporting and moving means.

2. In an overfeeding mechanism for a tenter frame having spaced-apart rails and means for supporting and moving a strip of textile material distended transversely of said rails, the combination comprising a pair of parallel shafts extending crosswise of said rails with one of said shafts disposed opposite the upper surface of said strip and the other of said shafts disposed opposite the under surface of said strip, bearings for each of said shafts, means carried by said rails for pivotally supporting said bearings for pivotal movement in a plane parallel to the plane of said rails, toothed rollers mounted on said shafts and having teeth for contacting opposite surfaces of said strip thereby to contract said strip into undulations, means carried by said rails for moving said bearings for one of said shafts for varying the depth of said undulations, and means for driving one of said shafts.

3. In an overfeeding mechanism for a tenter frame having spaced-apart rails and means supporting and moving a strip of textile material distended transversely of said rails, the combination comprising upper and lower shafts extending crosswise of said rails with the upper of said shafts disposed opposite the upper surface of said strip and the lower of said shafts disposed opposite the under surface of said strip, bearings supporting said shafts, toothed rollers mounted on said shafts and having teeth for contacting opposite surfaces of said strip thereby to contract said strip into undulations, said toothed rollers including a pair of rollers mounted on said upper shaft, each of said rollers being driven by said upper shaft, and including a second pair of rollers mounted on said lower shaft, one of said second pair of rollers being connected to said lower shaft for rotation therewith and the other of said second pair of rollers being rotatable on said lower shaft, means for varying the distance between said supporting bearings of said upper and lower shafts, respectively, and means for driving said rollers.

4. In an overfeeding mechanism for a tenter frame having spaced-apart rails and means supporting and moving a strip of textile material distended transversely of said rails, the combination comprising upper and lower shafts extending crosswise of said rails with the upper of said shafts disposed opposite the upper surface of said strip and the lower of said shafts disposed opposite the under surface of said strip, bearings supporting said shafts, means carried by said rails for pivotally mounting said bearings for movement parallel to the path of said strip, toothed rollers mounted on said shafts and having teeth for contacting opposite surfaces of said strip, said toothed rollers including a pair of rollers mounted on said upper shaft, and including a second pair of rollers mounted on said lower shaft, means for rotating said shafts and rollers, and means for varying the distance between said shafts, said last-named means including an elevating and lowering device supporting said bearings for said lower shaft.

5. In an overfeeding mechanism for a tenter frame having spaced-apart rails and means supporting and moving a strip of textile material distended transversely of said rails, the combination comprising upper and lower shafts extending crosswise of said rails with the upper of said shafts disposed opposite the upper surface of said strip and the lower of said shafts disposed opposite the under surface of said strip, bearings pivotally mounted to said rails for supporting said upper shaft, bearings for said lower shaft, means pivotally mounted to said rails for supporting said last-named bearings, said last-named means including devices for elevating and depressing said last-named bearings in respect to said rails, toothed rollers mounted on said shafts and having teeth for contacting opposite surfaces of said strip thereby to contract said strip into undulations, said toothed rollers including a pair of rollers mounted on said upper shaft and a second pair of rollers mounted on said lower shaft, means for rotating said shafts and rollers, a third shaft extending between and rotatably supported by said supporting means for the bearings of said lower shaft, and gearing intermediate said third shaft and said elevating and depressing devices whereby the vertical position of said bearings for said lower shaft is adjustable.

6. In an overfeeding mechanism for a tenter frame having spaced-apart rails and means supporting and moving a strip of textile material distended transversely of said rails, the combination comprising upper and lower shafts extending crosswise of said rails with the upper of said shafts disposed opposite the upper surface of said strip and the lower of said shafts disposed opposite the under surface of said strip, means rotatably supporting said shafts, said supporting means being mounted to said rails and constructed and arranged for enabling adjustment of the angularity of said shafts with respect to said rails, toothed rollers mounted on said shafts and having teeth for contacting opposite surfaces of said strip, said toothed rollers including two rollers mounted on said upper shaft with one of said two rollers being fixed to said upper shaft and the second of said two rollers being slidable lengthwise of said upper shaft, a thrust bearing connected to said second of said two rollers and to one of said supporting means, and including two rollers mounted on said lower shaft, one of said last two rollers being fixed to said lower shaft and the other of said last two rollers being rotatable on said lower shaft, a thrust bearing connected to said other of said last two rollers and to one of said supporting means, and means for varying the spacing of said rails.

7. In a tenter frame, side rails for guiding endless chains carrying tenter clips which close on the selvages of a strip of textile material and traverse the strip lengthwise of the frame, said rails including a pair of rails diverging from the entrance end of said frame and thereby moving the tenter clips travelling therealong laterally of the strip for effecting closing of the tenter clips on the selvages of said strip at a closing station intermediate the ends of said pair of rails, means for advancing said endless chains and tenter clips along said rails, means engaging opposite surfaces of said strip intermediate the entrance end of said pair of diverging rails and said closing station for overfeeding said strip to said closing station, and means for driving said overfeeding means at a rate of speed to draw the selvages of said strip into and through open tenter clips approaching said overfeeding means and thereby presenting taut selvages to the open clips and to overfeed said strip to said closing station.

References Cited in the file of this patent
UNITED STATES PATENTS

| | | |
|---|---|---|
| 1,944,001 | Cluett | Jan. 16, 1934 |
| 2,325,545 | Redman | July 27, 1943 |

FOREIGN PATENTS

| | | |
|---|---|---|
| 101,837 | Sweden | Apr. 24, 1941 |